United States Patent Office 3,452,837
Patented July 1, 1969

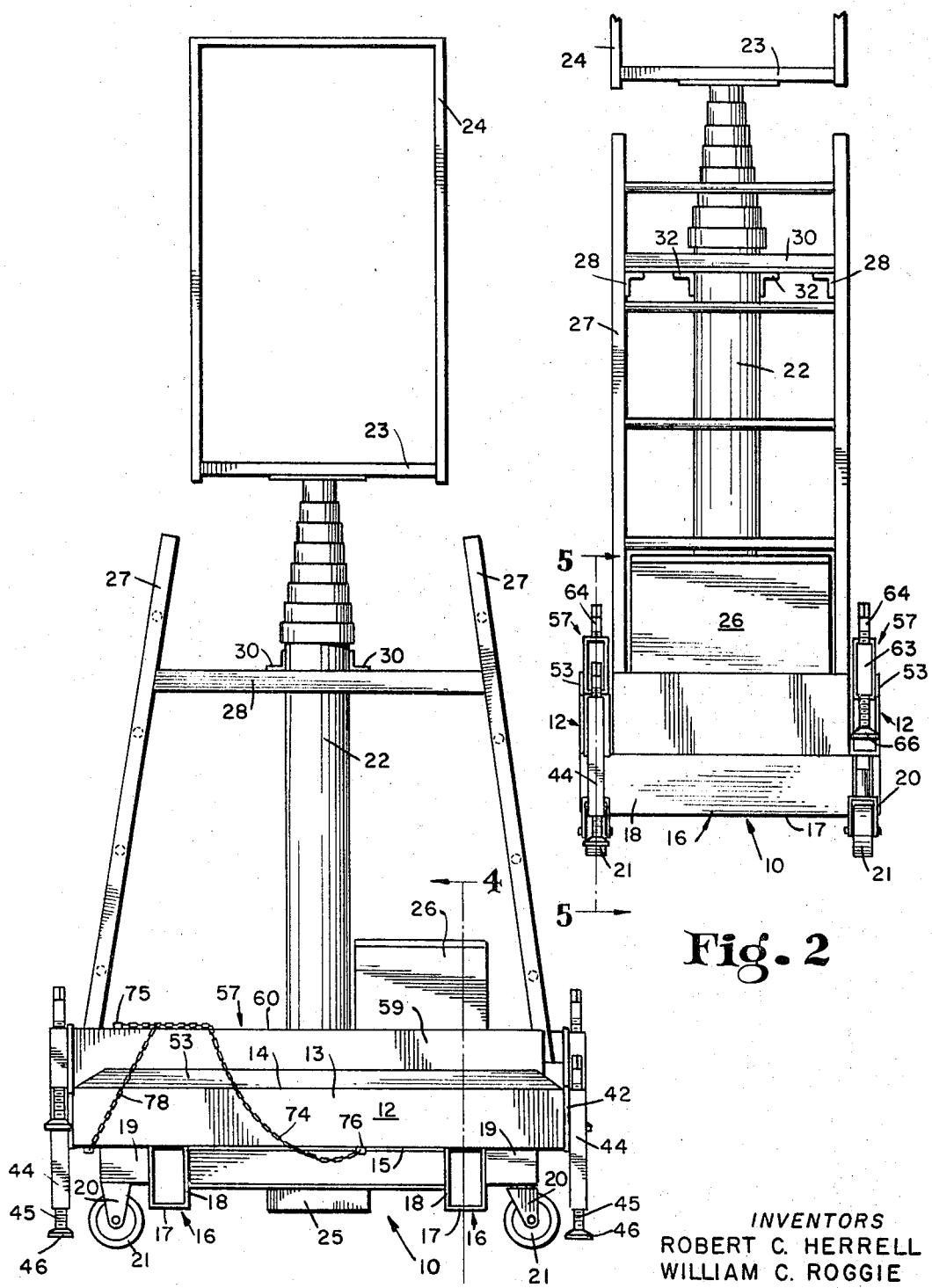

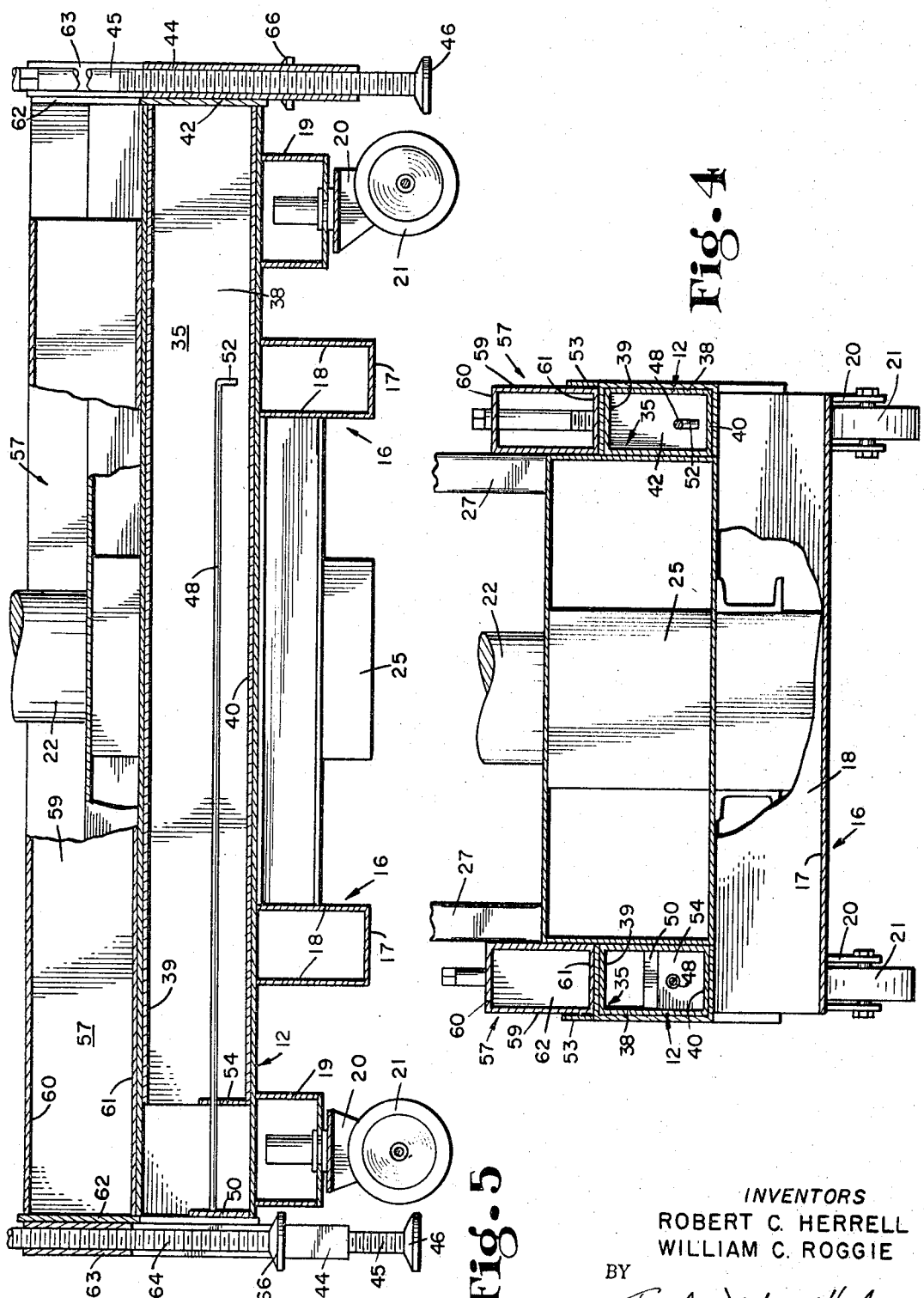

3,452,837
SCAFFOLD TRUCK
Robert C. Herrell and William C. Roggie, Indianapolis, Ind., assignors to Baker Roos, Inc., Indianapolis, Ind., a corporation of Indiana
Filed June 15, 1967, Ser. No. 646,279
Int. Cl. E04g 1/24, 5/02; B60r 27/00
U.S. Cl. 182—17  5 Claims

ABSTRACT OF THE DISCLOSURE

A scaffold truck having a base supported on a plurality of ground-engageable wheels and provided with a vertically movable scaffold. A plurality of outriggers are mounted on said base and are movable between retracted positions on said base and operative positions projecting outwardly therefrom for stabilizing said truck when the scaffold is extended.

Summary of the invention

In accordance with the preferred form of the invention, there is provided a base having a plurality of ground-engageable wheels mounted thereon for movement of the truck from one location to another. A plurality of telescoping cylinders supporting a work platform are mounted on said base and are vertically movable for raising and lowering said platform with respect to said base. Conveniently, ladders are mounted on the platform for permitting a workman to mount and demount said platform and for bracing said cylinders.

A plurality of channels are provided on the base which cross-brace said base and support a plurality of stabilizing outriggers. Each of said outriggers comprises an elongated beam receivable in one of said channels and provided with an adjustable foot at one of its ends. The outriggers can be moved between retracted storage positions on the base and extended operative positions in said channels which project outwardly from the sides of said base with their feet engaging the ground for stabilizing the truck when the platform is moved into an extended work position.

Brief description of the drawings

The accompanying drawings illustrate the invention. In such drawings:

FIG. 1 is a side elevation of a scaffold truck embodying the invention;

FIG. 2 is an end elevation of the truck shown in FIG. 1;

FIG. 4 is an enlarged vertical section taken on the line 4—4 of FIG 1; and

FIG. 5 is an enlarged fragmentary vertical section taken on the line 5—5 of FIG. 2.

Detailed description

Figure 3:
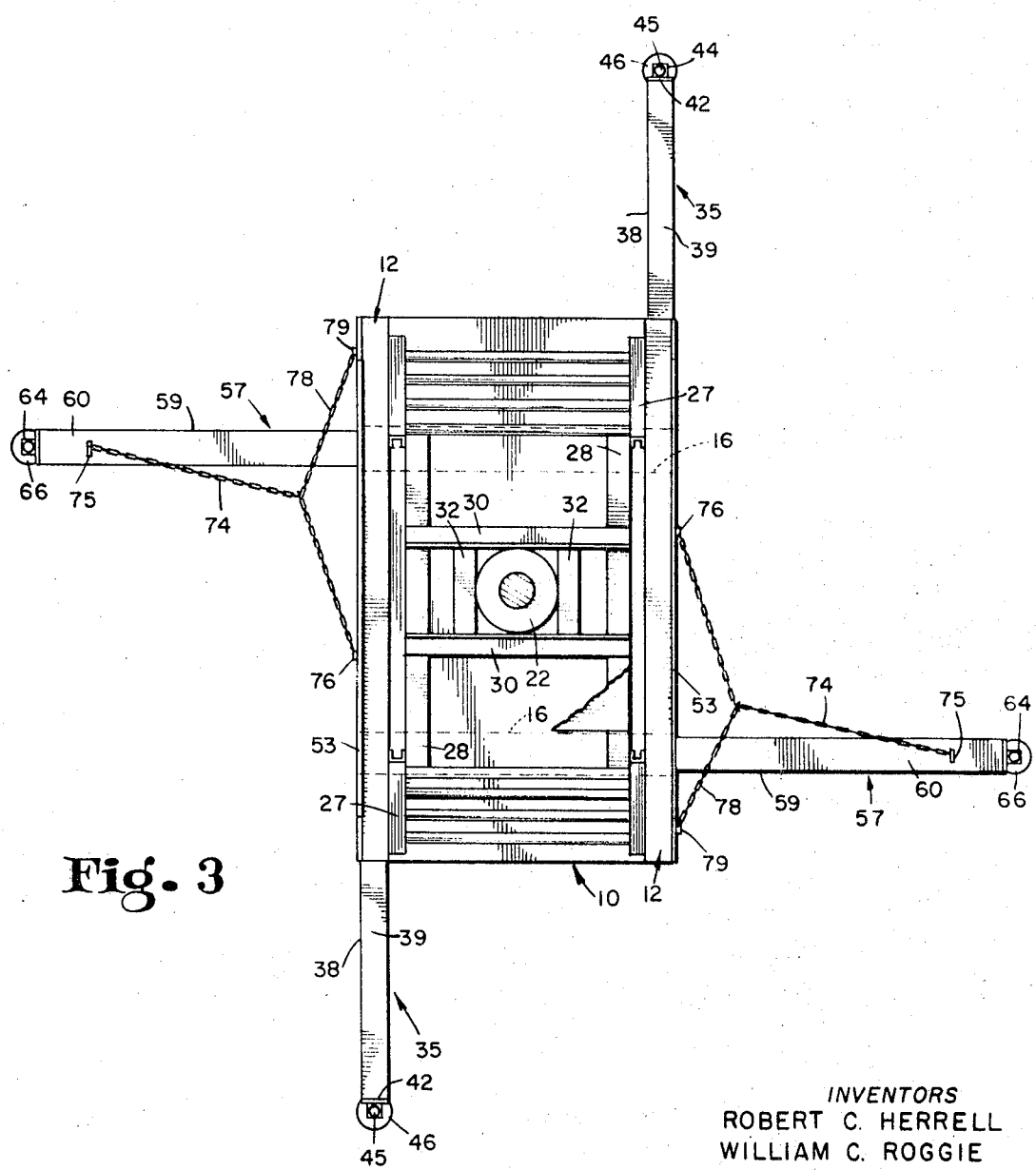
FIG. 3 is a plan view of the truck shown in FIG. 1, but showing said truck with its outriggers in operative position.

As shown, our truck comprises a base 10 having a generally rectangular shape and provided with a pair of rectangular channels 12 extending along its opposed longitudinal edges. As shown, each of the channels 12 extends the length of the truck and has a side wall 13 interconnecting a top and bottom wall 14 and 15 connected at their inner edges to a side of the base 10. A second pair of rectangular channels 16 extend transversely below the base adjacent the ends thereof. Each of said channels is formed from a bottom wall 17 connected to a pair of side walls 18 connected to the bottom of said base. As shown, a block 19 is mounted at each end of the bottom walls 15 of channels 12. Each of said blocks has a bracket 20 swivelly mounted thereon and connected to a ground-engageable wheel 21 for moving the truck from one location to another.

A vertically extending, telescoping cylinder assembly 22 is mounted on the base 10 at the center thereof. The innermost cylinder in said assembly is connected to a work platform 23 having a guard rail 24 extending therearound. The cylinder assembly 22 can be raised and lowered by any conventional hydraulic system, and to this end, the oil for said assembly is carried in a reservoir 25 provided on the base 10 and connected to the assembly through a conventional pump-motor assembly 26 also mounted on said base.

As shown in FIG. 1, when the cylinder assembly 22 is retracted, the platform 23 will be disposed in a substantially elevated position above the base 10. In order to permit a workman to mount and demount said platform, a pair of ladders 27 are mounted at the opposed ends of the base 10. The ladders are interconnected adjacent their upper ends by a pair of longitudinally extending braces 28 disposed on opposite sides of the cylinder assembly 22. The braces 28 are interconnected intermediate their ends by a pair of transverse, longitudinally spaced braces 30 disposed on opposite sides of the assembly 22 and connected thereto. A third pair of braces 32 interconnect the braces 30 on opposite sides of the assembly 22 and are connected thereto. Thus, the several pairs of braces 28, 30 and 32 serve to cross-brace the ladders 27 and support the cylinder assembly 22

As shown in FIGS. 4 and 5, a pair of outriggers 35 are slidably mounted in the channels 12. Each of said outriggers is identical in construction and comprises an elongated rectangular beam formed by a pair of side walls 38 interconnected by top and bottom walls 39 and 40. The outer end of the beam is closed by an end plate 42 to which a threaded vertical sleeve 44 is mounted. A threaded leg 45 is carried in the sleeve 44 and is connected at its lower end to a ground-engageable foot 46.

The outriggers 35 are slidably carried in the channels 12, and to prevent them from being removed from said channels, an elongated rod 48 is connected to a plate 50 at one end of each of said channels. Said rod extends through the outrigger beam carried in said channel and terminates at its inner end in a down-turned finger 52 engageable with a transverse plate 54 mounted on the beam bottom wall 40 adjacent its inner end. Thus, as the outrigger beams are slid outwardly in the channels 12, the rod ends 52 will engage the beam plates 54 to limit the outward sliding movement of the outriggers. When said outriggers are in their extended positions, the legs 45 can be rotated in the sleeves 44 to bring their feet 46 into engagement with the ground for stabilizing the truck in a longitudinal direction.

As shown in FIGS. 1 and 2, a longitudinally extending rail 53 projects upwardly from the channel side wall 13 at each side of the base 10. Said rails releasably locate a second pair of outriggers 57 supported on the base on the channel top walls 14. Each of the outriggers 57 is identical in construction, and comprises an elongated rectangular beam having side walls 59 interconnected by top and bottom walls 60 and 61. At one of their ends, the beams are closed by an end plate 62 to which a vertically extending, threaded sleeve 63 is connected. A threaded leg 64 is carried in each of the sleeves 63 and is connected at its lower end to a ground-engageable foot 66. The outriggers 57 are removable from their storage position on top of the channels 12 into the pair of transverse channels 16 in operative positions projecting outwardly from the opposite sides of the truck with their feet 66 engaging the ground for stabilizing the truck against any lateral tilting movement.

As shown in FIG. 3, an elongated chain 74 is connected at one of its ends to a bracket 75 mounted on the top wall 60 of each of the outriggers 57. The opposite end of said chain is connected to a bracket 76 mounted on the base. A second chain 78 is connected at one of its ends to the chain 74 and at is opposite end to a bracket 79 mounted on base 10. The chains 78 can be disconnected from their brackets 79 to permit the outriggers to be moved their storage and operative positions, with the chains 74 preventing said outriggers from being disconnected from the truck. With the chains 78 connected to the bracket 79, and the outriggers 57 inserted into the channels 16 to a distance which will permit the chains 74 and 78 to be drawn taut, the outrigger feet 66 will be disposed at the same distance from the center of the truck as the feet 46 of outriggers 35 when the latter are in their fully extended operative positions.

As shown in FIG. 3, the outriggers 35, in their operative positions, project outwardly from the opposite ends of the base at the opposite sides thereof. And the outriggers 57, in their operative positions, project outwardly from the opposite sides of the base adjacent the opposite ends thereof. In this manner, the pair of outriggers 35 and 57 stabilize the truck against both longitudinal and lateral tilting even though the platform 23 be extended into its maximum elevated position. When it is desired to move the truck from one location to another, the outrigger feet 46 and 66 can be retracted by moving their legs upwardly in sleeves 44 and 63. If the truck must pass through narrow passages or doorways in moving from one location to another, the outriggers can be moved into their storage positions by merely sliding the outriggers 35 inwardly in channels 12 and moving the outriggers 57 from their channels 16 into their storage positions on the base.

We claim:

1. A scaffold truck, comprising a base supported on a pluraility of ground-engageable wheels, an elevated work platform carried from said base, a first pair of channel forming means extending longitudinally of said base, a second pair of channel forming means extending transversely of said base, a first pair of outriggers each having a ground-engageable foot and slidably carried in said first pair of channel forming means for movement between a retracted position in which their feet are adjacent said base and an operative position in which their feet are spaced outwardly from the diagonally opposed ends of said base, a second pair of outriggers each having a ground-engageable foot and movable between a retracted position on said base with their feet adjacent said base and an operative position in which they are supported in said second channel forming means with their feet spaced outwardly from the opposed sides of said base adjacent the opposite ends thereof, and means operatively interconnecting the outriggers to the base for disposing the outrigger feet in each pair of outriggers equidistant from said base.

2. A scaffold truck as set forth in claim 1 in which said means comprise cooperating abutment means on each of said first outriggers and said first channel forming means for limiting the movement of said first outriggers into their operative positions, and chain means on each of said second outriggers interconnecting it to said base for limiting the positioning of the feet thereon with respect to said base when said second outriggers are in operative position.

3. A scaffold truck comprising a base supported on a plurality of ground-engageable wheels, an elevated work platform carried from said base, a first pair of channel forming means extending longitudinally of said base, a second pair of channel forming means extending transversely of said base, a first pair of outriggers each having a ground-engageable foot and slidably carried in said first pair of channel forming means for movement between a retracted position in which their feet are adjacent said base and an operative position in which their feet are spaced outwardly from said base, a second pair of outriggers each having a ground-engageable foot and moveable between a retracted position on said base with their feet adjacent said base and an operative position in which they are supported in said channel forming means with their feet spaced outwardly from said base, each of said first outriggers and said first channel forming means having abutment means comprising an elongated member in each of said first channel forming members having a vertically extending finger engageable with a transverse plate on the outrigger carried therein for limiting the movement of said first outriggers into their operative positions, and each said second outriggers having chain means interconnecting it to said base for limiting the positioning of the feet thereon with respect to said base when said second outriggers are in operative position.

4. A scaffold truck as set forth in claim 2 in which said chain means comprises a pair of first chains connected to each of said second outriggers and base, and a pair of second chains connected to each of said first chains intermediate the lengths thereof and to said base, at least one of the connections of each of said second chains being removable.

5. A scaffold truck, comprising a generally rectangular base supported on a plurality of ground-engageable wheels, a plurality of vertically extending telescoping cylinders mounted on said base, means on said base for telescoping said cylinders, a work platform carried on said cylinders for vertical movement with respect to said base, a pair of ladders mounted on said base on the opposed sides of said cylinders, brace means interconnecting said ladders adjacent the upper ends thereof and interconnected to said cylinders, a plurality of outriggers movable between retracted positions on said base and outwardly projecting operative ground-engaging positions adjacent the corners of said base, and means operatively interconnecting each of said outriggers to said base for disposing said outrigger feet at the desired distances from said base.

References Cited

UNITED STATES PATENTS

| 364,186 | 5/1887 | Opp | 182—141 |
| 604,531 | 5/1898 | Huber | 182—17 |
| 2,393,087 | 1/1946 | Chiarello | 182—17 |
| 2,676,677 | 4/1954 | Anderson | 182—148 |
| 2,857,212 | 10/1958 | Everitt | 182—17 |

REINALDO P. MACHADO, *Primary Examiner.*

U.S. Cl. X.R.

182—63, 141; 280—150